United States Patent
Hwang

(10) Patent No.: US 9,094,244 B2
(45) Date of Patent: Jul. 28, 2015

(54) RECEIVER CIRCUIT WITH DE-EMPHASIS FUNCTION

(71) Applicant: SK hynix Inc., Gyeonggi-do (KR)

(72) Inventor: Tae-Jin Hwang, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 157 days.

(21) Appl. No.: 13/841,941

(22) Filed: Mar. 15, 2013

(65) Prior Publication Data

US 2014/0177696 A1    Jun. 26, 2014

(30) Foreign Application Priority Data

Dec. 26, 2012   (KR) .......................... 10-2012-0152860

(51) Int. Cl.
  *H04B 3/04*      (2006.01)
  *H04L 25/02*     (2006.01)

(52) U.S. Cl.
  CPC .................................. *H04L 25/0272* (2013.01)

(58) Field of Classification Search
  CPC ...................... H04L 25/03891; H04L 25/0272
  USPC .............. 333/14, 18; 330/254, 260, 261, 304;
                                        375/229, 230, 232, 233
  See application file for complete search history.

(56) References Cited

U.S. PATENT DOCUMENTS

| 7,173,489 | B1 * | 2/2007 | Song et al. .................... 330/254 |
| 7,403,071 | B2 * | 7/2008 | Hollenbeck et al. .......... 330/254 |
| 7,459,980 | B2 * | 12/2008 | Drottar ......................... 330/304 |
| 7,826,522 | B2 * | 11/2010 | Sumesaglam ................. 375/229 |
| 8,200,179 | B1 * | 6/2012 | Mosinskis et al. ......... 455/232.1 |
| 8,285,230 | B2 * | 10/2012 | Komori ....................... 455/127.3 |
| 8,335,249 | B1 * | 12/2012 | Su et al. ........................ 375/232 |
| 8,836,423 | B2 * | 9/2014 | Lavasani ....................... 330/133 |
| 2005/0140454 | A1 * | 6/2005 | Uesaka et al. ................. 330/308 |
| 2011/0001562 | A1 | 1/2011 | Sohn et al. |

FOREIGN PATENT DOCUMENTS

KR          1020090015725          2/2009

\* cited by examiner

*Primary Examiner* — Dean Takaoka
*Assistant Examiner* — Alan Wong
(74) *Attorney, Agent, or Firm* — IP & T Group LLP

(57) ABSTRACT

A receiver circuit includes a first differential amplification unit including a variable load section, and configured to receive first and second input signals, and to generate first and second output signals, which are amplified based on an impedance value of the variable load section and a voltage difference between the first and second input signals, a second differential amplification unit configured to receive the first and second output signals and to generate a third output signal based on a voltage difference between the first and second output signals, and a signal generating unit configured to generate an equalization signal for controlling the variable load section based on the third output signal.

15 Claims, 4 Drawing Sheets

RECEIVER CIRCUIT WITH DE-EMPHASIS FUNCTION

CROSS-REFERENCE TO RELATED APPLICATIONS

The present application claims priority of Korean Patent Application No. 10-2012-0152860 filed on Dec. 24, 2012, which is incorporated herein by reference in its entirety.

BACKGROUND

1. Field

Exemplary embodiments of the present invention relate to semiconductor design technology, and more particularly to a receiver circuit with a de-emphasis function.

2. Description of the Related Art

In integrated circuits, such as semiconductor memory devices, an operating voltage becomes lower, and a speed of transmitted signals gradually increases. When a transmitter transmits a digital signal through a channel having a loss, a receiver receives the transmitted signal in a state that is distorted depending on frequency components of the channel.

In general, since a channel has more losses in a high-frequency region, high-frequency components of a digital signal transmitted through the channel are attenuated more than low-frequency components. The high-frequency components in the digital signal correspond to voltage levels of the digital signal, which are changing rapidly, i.e., rising and falling edges. Accordingly, a waveform of the digital signal transmitted through the channel having a loss is distorted more than the original waveform, and the time at which the digital signal is arrived may differ depending on frequency components. As a result, lots of jitters may occur and overall timing margin may be reduced. Further, interference between the data, i.e., inter-symbol interference (ISI) arises. That is, since the time at which the digital signal is arrived may differ depending on frequency components due to the channel loss, successive data may overlap, which may result in incorrect delivery in a case of high-speed communication or a long-channel communication.

To resolve these concerns, the receiver circuit emphasizes or suppresses a signal depending on a frequency band to compensate for distortions that are generated through the channel having a loss, and controls a waveform of the signal so that the receiver circuit may receive the original waveform of the signal. Such a technique is called "equalization" such as a pre-emphasis method and a de-emphasis method.

FIGS. 1A and 1B are diagrams for explaining a pre-emphasis method and a de-emphasis method for a conventional receiver circuit.

Referring to FIG. 1A, in the pre-emphasis method, when a signal transits to a logic high/low level from a logic low/high level, a forepart of the transited signal is emphasized. That is, when the signal transits to a logic high level from a logic low level, a forepart of the logic high level of the transited signal is set to a voltage level higher than a target voltage at a logic high level (see numeral references 11 and 12). Further, when the signal transits to a logic low level from a logic high level, a forepart of the logic low level of the transited signal is set to a voltage level lower than a target voltage at a logic low level (see numeral references 13 and 14). In the pre-emphasis method, a level of the signal is emphasized at edges of the signal in consideration of an attenuation of the channel loss since the high-frequency components of the signal mainly remain on the edges.

Referring to FIG. 1B, in the de-emphasis method, when a signal transits to a logic high/low level from a logic low/high level, a rear part of the transited signal is de-emphasized. That is, when the signal transits to a logic high level from a logic low level, a rear part of the logic high level of the transited signal is set to a voltage level lower than a target voltage at a logic high level (see numeral references 15 and 16). Further, when the signal transits to a logic low level from a logic high level, a rear part of the logic low level of the transited signal is set to a voltage level higher than the target voltage at a logic low level (see numeral references 17 and 18). In the de-emphasis method, a level of the signal is relatively emphasized on edges of the transited signal in comparison with rear parts of the transited signal, and thus equalization may be secured when an amplitude of the signal is attenuated due to the high-frequency components remaining on the edges of the transited signal.

In designing the receiver circuit of an integrated circuit, developing a technology to implement a de-emphasis equalization method is in demand.

SUMMARY

Exemplary embodiments of the present invention are directed to a receiver circuit that may compensate a distorted input signal by a de-emphasis equalization method.

In accordance with an embodiment of the present invention, a receiver circuit includes a first differential amplification unit including a variable load section, and configured to receive first and second input signals, and to generate first and second output signals, which are amplified based on an impedance value of the variable load section and a voltage difference between the first and second input signals a second differential amplification unit configured to receive the first and second output signals and to generate a third output signal based on a voltage difference between the first and second output signals, and a signal generating unit configured to generate an equalization signal for controlling the variable load section based on the third output signal.

In accordance with another embodiment of the present invention, a receiver circuit includes a first differential amplification unit including first and second variable load sections, and configured to receive first and second input signals, and to generate first and second output signals, which are amplified based on first and second impedance values of the first and second variable load sections and a voltage difference between the first and second input signals, a second differential amplification unit configured to receive the first and second output signals and to generate a third output signal based on a voltage difference between the first and second output signals, and a delay signal generating unit configured to delay the third output signal and to generate first and second equalization signals for controlling each of the first and second variable load sections and a final output signal corresponding to the first input signal.

The receiver circuit in accordance with an embodiment of the preset invention may perform in a high-frequency region. The receiver circuit may efficiently compensate the distorted input signal by a de-emphasis equalization method.

DETAILED DESCRIPTION

Figure 1A:
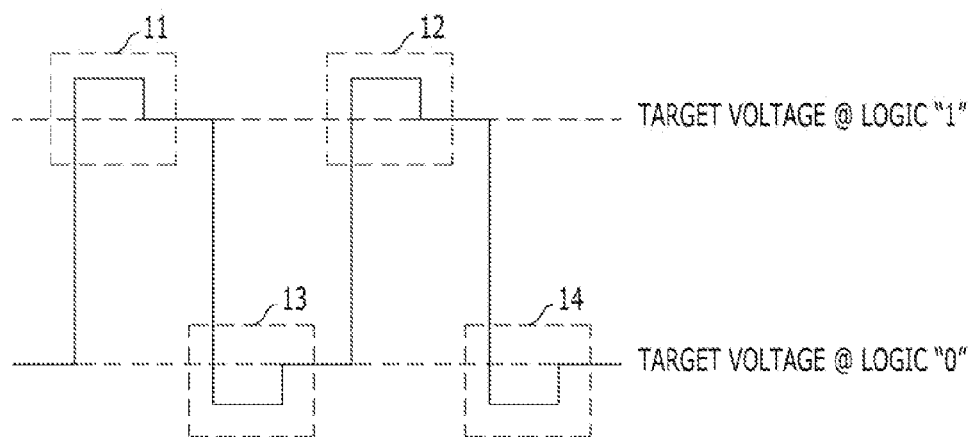
FIGS. 1A and 1B are diagrams for explaining a pre-emphasis method and a de-emphasis method for a conventional receiver circuit.
Figure 1B:
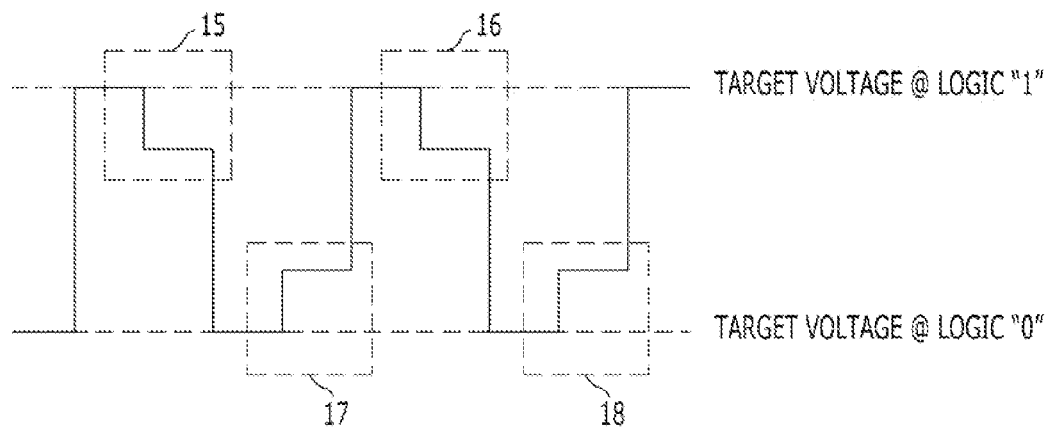

Hereinafter, embodiments of the present invention will be described in detail with reference to the accompanying drawings. However, the present invention is not limited to embodiments described below, but may be configured in various other forms. Therefore, the present embodiments are provided to complete the disclosure of the present invention and fully inform those skilled in the art of the scope of the present invention. Throughout the disclosure, reference numerals correspond directly to the like numbered parts in the various figures and embodiments of the present invention. It is also noted that in this specification, connected/coupled refers to one component not only directly coupling another component but also indirectly coupling another component through an intermediate component. In addition, a singular form may include a plural form as long as it is not specifically mentioned in a sentence.

For reference, a logic signal of a circuit and a value of a binary data may be classified into a logic high level or a logic low level corresponding to voltage levels, and may represented by '1' or '0', and may defined to have a high-impedance state depending on the need. Also, a logic low level as well as a logic high level may indicate an activation status of signal and circuit in accordance with an embodiment.

Figure 2:
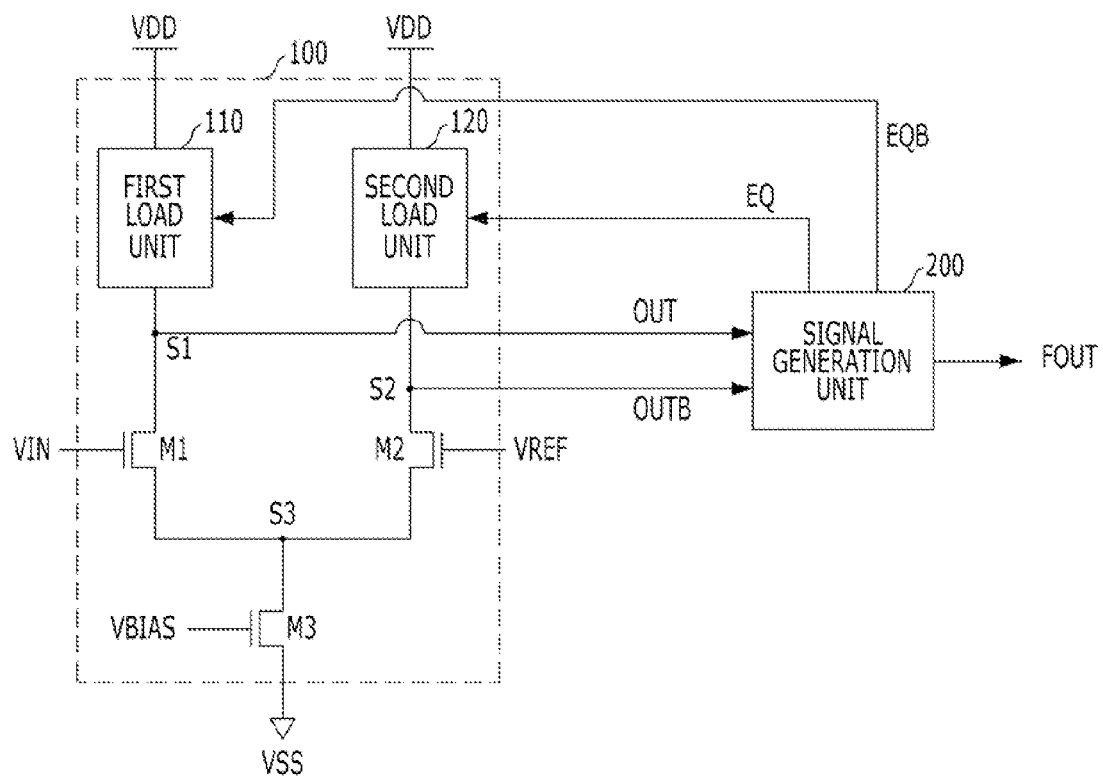
FIG. 2 is a block diagram illustrating a receiver circuit with a de-emphasis function in accordance with an embodiment of the present invention.

FIG. 2 is a block diagram illustrating a receiver circuit with a de-emphasis function in accordance with an embodiment of the present invention.

Referring to FIG. 2, the receiver circuit includes a first differential amplification unit 100 and a signal generating unit 200. The receiver circuit performs a de-emphasis equalization operation by adjusting first and second impedance values of first and second load units 110 and 120 of the first differential amplification unit 100 that receive first and second equalization signals EQ and EQB output from the signal generating unit 200, respectively.

The first differential amplification unit 100 is configured to generate first and second output signals OUT and OUTB by comparing voltage levels between a first input signal VIN and a reference voltage VREF by adjusting the first and second impedance values of the first and second load units 110 and 120 that are controlled by the first and second equalization signals EQ and EQB, respectively. The signal generating unit 200 is configured to generate the first and second equalization signals EQ and EQB and a final output signal FOUT based on the first and second output signals OUT and OUTB. Here, the first and second equalization signals EQ and EQB are differential signal's having opposite phase.

First, when a bias signal VBIAS is input to a NMOS transistor M3, the first differential amplification unit 100 is activated. NMOS transistors M1 and M2 receive the first input signal VIN and the reference voltage VREF, and then the first and second output signals OUT and OUTB are diverged in response to a voltage level of the first input signal VIN and the first and second impedance values of the first and second load units 110 and 120. Here, an amplification gain of the first differential amplification unit 100 is controlled by adjusting the first and second impedance values of the first and second load units 110 and 120, and thus the de-emphasis equalization operation is performed on the first and second output signals OUT and OUTB.

Figure 3:
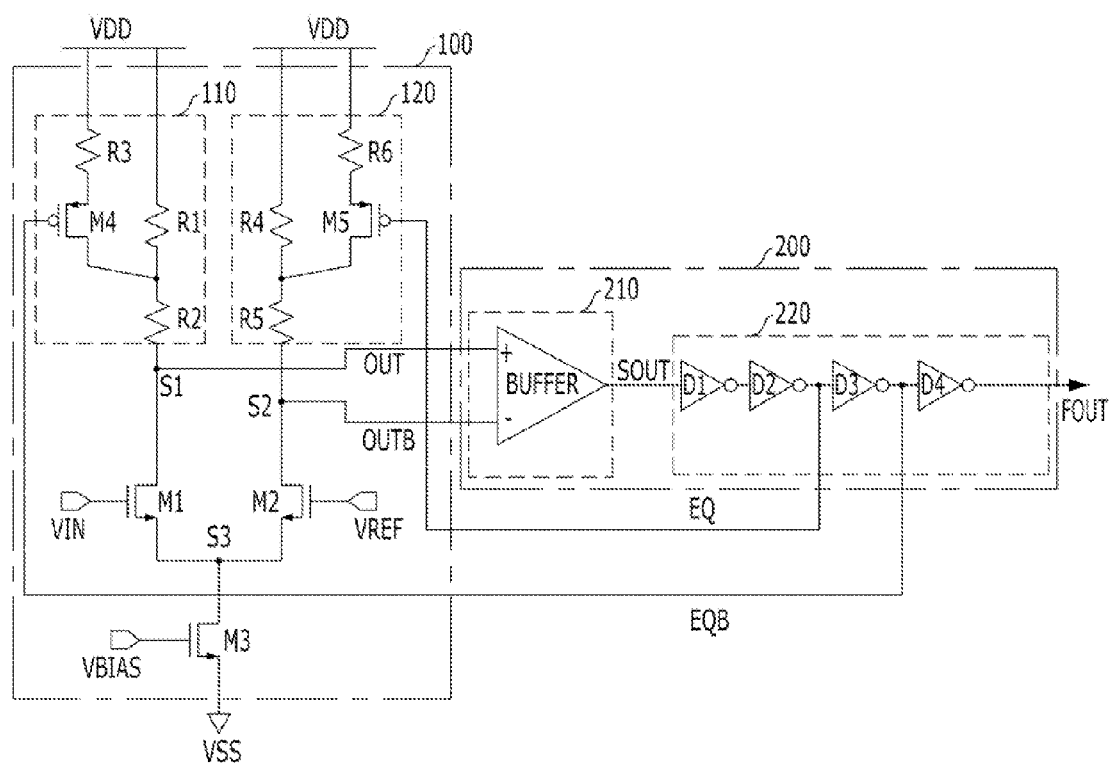
FIG. 3 is a detailed circuit diagram illustrating a receiver circuit shown in FIG. 2.

FIG. 3 is a detailed circuit diagram illustrating the receiver circuit shown in FIG. 2.

Referring to FIG. 3, the first differential amplification unit 100 includes NMOS transistors M1 and M2 receiving the first input signal VIN and the reference voltage VREF, respectively, the NMOS transistor M3 sinking a bias current, and the first and second load units 110 and 120.

The NMOS transistor M1 includes a gate receiving the first input signal VIN, and a source-drain path provided between a first node S1 and a third node S3. The NMOS transistor M2 includes a gate receiving the reference voltage VREF and a source-drain path provided between a second node S2 and the third node S3. The NMOS transistor M3 includes a gate receiving the bias signal VBIAS and a source-drain path provided between the third node S3 and a ground voltage (VSS) terminal. The first differential amplification unit 100 outputs the first output signal OUT as a positive output signal through the first node S1, and the second output signal OUTB as a negative output signal through the second node S2.

Further, in the first differential amplification unit 100, the first load unit 110 is coupled between a supply voltage (VDD) terminal and the first node S1 and adjusts the first impedance value thereof in response to the second equalization signal EQB. The second load unit 120 is coupled between the supply voltage (VDD) terminal and the second node S2 and adjusts the second impedance value thereof in response to the first equalization signal EQ.

In detail, the first load unit 110 includes first to third resistors R1, R2, and R3, and a PMOS transistor M4. The first and second resistors R1 and R2 are coupled in series between the supply voltage (VDD) terminal and the first node S1. One terminal of the third resistor R3 is coupled to the supply voltage (VDD) terminal. The PMOS transistor M4 includes a gate receiving the second equalization signal EQB and a source-drain path provided between the other terminal of the third resistor R3 and a common node of the first and second resistors R1 and R2.

The second load unit 120 includes fourth to sixth resistors R4, R5, and R6, and a PMOS transistor M5. The fourth and fifth resistors R4 and R5 are coupled in series between the supply voltage (VDD) terminal and the second node S2. One terminal of the sixth resistor R6 is coupled to the supply voltage (VDD) terminal. The PMOS transistor M5 includes a gate receiving the first equalization signal EQ and a source-drain path provided between the other terminal of the sixth resistor R6 and a common node of the fourth and fifth resistors R4 and R5.

For reference, although the reference voltage VREF is a reference voltage, which maintains a preset voltage level in accordance with the embodiment, the reference voltage VREF may be replaced with a complementary signal of the first input signal VIN in another embodiment.

The signal generating unit 200 is configured to receive the first and second output signals OUT and OUTB, and to generate the first and second equalization signals EQ and EQB having an opposite phase, and to generate a final output signal FOUT that is finally compensated.

In detail, the signal generating unit 200 includes a second differential amplification unit 210 and a delay signal generating unit 220.

The second differential amplification unit 210 is configured to receive the first and second output signals OUT and OUTB of the differential signals to output a third output signal SOUT of a single-ended signal.

The delay signal generating unit 220 is configured to delay the third output signal SOUT to output the first and second equalization signals EQ and EQB and the final output signal FOUT. The delay signal generating unit 220 includes first to fourth inverters D1 to D4 coupled in series. While the third output signal SOUT passes through the first to fifth delays D1 to D4, the first and second equalization signals EQ and EQB may be output from any intermediate nodes among the first to fifth inverters D1 to D4, and the final output signal FOUT may be output from the fourth inverter D4. In FIG. 3, the first equalization signal EQ is output from the second inverter D2, and the second equalization signal EQB is output from third inverter D3. In the embodiment of the present invention, a delay time of the first and second equalization signals EQ and EQB may be controlled by using such a delay circuit, and thus the performance of an equalization operation may be maximized.

Figure 4:
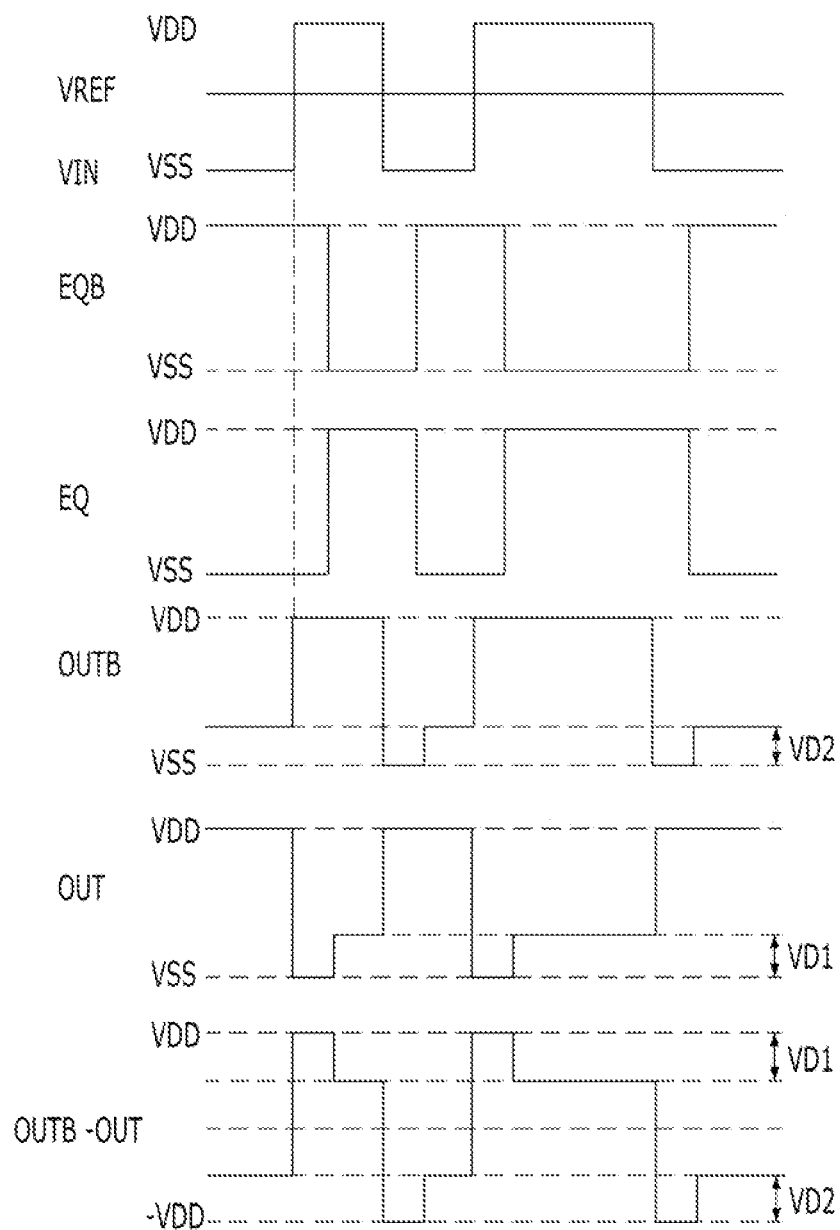
FIG. 4 is a waveform diagram illustrating an operation of a receiver circuit shown in FIG. 3.

FIG. 4 is a waveform diagram illustrating an operation of the receiver circuit shown in FIG. 3.

Hereinafter, referring to FIGS. 3 and 4, a de-emphasis equalization operation of the receiver circuit is described in detail.

First, when a voltage level of a first input signal VIN is transited to a logic high level from a logic low level (i.e., lower than a reference voltage VREF), the NMOS transistor M1 is turned on stronger compared to the NMOS transistor M2. Thus, current amount flowing through the NMOS transistor M1 is increased, and a voltage level of the first node S1 becomes lower. As a result, the first differential amplification unit 100 generates the first output signal OUT at a logic low level. In contrast, since a voltage level of the second node S2 becomes higher, and thus the first differential amplification unit 100 generates the second output signal OUTB at a logic high level.

The second differential amplification unit 210 receives the first output signal OUT at a logic low level, and the second output signal OUTB at a logic high level, and outputs a third output signal SOUT at a logic high level, based on a difference between the first and second output signal OUT and OUTB (i.e., 'OUTB−OUT'). The delay signal generating unit 220 receives the third output signal SOUT at a logic high level, and delays the third output signal SOUT to output a second equalization signal EQB at a logic low level.

At this time, the second equalization signal EQB at a logic low level is fed back to the gate of the PMOS transistor M4 and thus the PMOS transistor M4 is fully turned on. In response to the fully turned-on state of the PMOS transistor M4, the third resistor R3 is coupled between the supply voltage (VDD) terminal and the common node of the first and second resistors R1 and R2. Accordingly, the voltage level of the first node S1 may be charged, and a voltage level of the first output signal OUT is increased by a preset value 'VD1'. As a result, a de-emphasis equalization operation is performed to the first output signal OUT.

Meanwhile, the first equalization signal EQ has a logic high level, and thus the PMOS transistor M5 is turned off. Accordingly, a voltage level of the second output signal OUTB does not change and does maintain a logic high level.

On the contrary, when a voltage level of the first input signal VIN is transited to a logic low level from a logic high level (i.e., higher than the reference voltage VREF), the NMOS transistor M2 is turned on stronger compared to the NMOS transistor N1. Thus, current amount flowing through the NMOS transistor M2 is increased, and a voltage level of the second node S2 becomes lower. As a result, the first differential amplification unit 100 generates the second output signal OUTB at a logic low level. In contrast, since a voltage level of the first node S1 becomes higher, the first differential amplification unit 100 generates the first output signal OUT at a logic high level.

The second differential amplification unit 210 receives the first output signal OUT at a logic high level, and the second output signal OUTB at a logic low level, and outputs the third output signal SOUT at a logic low level, based on a difference between the first and second output signal OUT and OUTB (i.e., 'OUTB−OUT'). The delay signal generating unit 220 receives the third output signal SOUT at a logic low level, and delays the third output signal SOUT to output the first equalization signal EQ at a logic low level.

At this time, the first equalization signal EQ at a logic low level is fed back to the gate of the PMOS transistor M5, and thus the PMOS transistor M5 is fully turned on. In response to the fully turned-on state of the second PMOS transistor M5, the sixth resistor R6 is coupled between the supply voltage (VDD) terminal and the common node of the fourth and fifth resistors R4 and R5. Accordingly, the voltage level of the second node S2 may be charged, and a voltage level of the second output signal OUTB is increased by a preset value 'VD2'. As a result, a de-emphasis equalization operation is performed to the second output signal OUTB. For reference, the value 'VD1' may be substantially the same with the value 'VD2'.

Meanwhile, the second equalization signal EQB has a logic high level, and thus the PMOS transistor M4 is turned off. Accordingly, a voltage level of the first output signal OUT does not change and does maintain a logic high level.

For reference, the first and second equalization signals EQ and EQB are used to adjust the first and second impedance values of the first and second load units 110 and 120. Accordingly, although the first and second equalization signals EQ and EQB fully swing from a logic high level to a logic low level, the size of the PMOS transistors M4 and M5 does not need to be decreased. In order word, a length of a transistor does not need to be increased. Accordingly, since an input capacitance of the PMOS transistors M4 and M5 may be a small value, a bandwidth of an operating frequency may be broadened, and characteristics in a high-frequency region may be improved.

As set forth above, in accordance with the embodiments of the present invention, a de-emphasis equalization operation is performed as the first and second impedance values of the first and second load units 110 and 120 are adjusted in response to the first and second equalization signals EQ and EQB. This may amplify high-frequency components while reducing amplitudes of the input signal VIN containing lots of low-frequency components. As a result, the de-emphasis equalization operation shows characteristics of a high-pass filter.

In accordance with the embodiments of the present invention, a receiver circuit may achieve a de-emphasis equalization effect by adjusting an amplification gain according as an impedance value of a differential amplifier changes in response to the equalization signals.

While the present invention has been described with respect to the specific embodiments, it should be noted that the embodiments are for describing, do not limit the present invention. Further, it should be noted that the present invention may be achieved in various ways through substitution, change, and modification, by those skilled in the art without departing from the scope of the present invention.

In addition, the logic gates and the transistors exemplified in the embodiments described above may be implemented with different positions and types, depending on the polarity of related signals.

What is claimed is:

1. A receiver circuit comprising:
 a first differential amplification unit including a variable load section, and configured to receive first and second input signals, and to generate first and second output signals, which are amplified based on an impedance value of the variable load section and a voltage difference between the first and second input signals;
 a second differential amplification unit configured to receive the first and second output signals and to generate a third output signal based on a voltage difference between the first and second output signals; and
 a signal generating unit configured to generate an equalization signal for controlling the variable load section to perform de-emphasis equalization operation, based on the third output signal.

2. The receiver circuit of claim 1, wherein the first input signal is an input signal, and the second input signal is a reference voltage.

3. The receiver circuit of claim 1, wherein the first and second input signals are differential signals having opposite phases.

4. The receiver circuit of claim 1, wherein the signal generating unit generates the equalization signal by delaying the third output signal.

5. A receiver circuit comprising:
 a first differential amplification unit including first and second variable load sections, and configured to receive first and second input signals, and to generate first and second output signals, which are amplified based on first and second impedance values of the first and second variable load sections and a voltage difference between the first and second input signals;
 a second differential amplification unit configured to receive the first and second output signals and to generate a third output signal based on a voltage difference between the first and second output signals; and
 a delay signal generating unit configured to delay the third output signal and to generate first and second equalization signals for controlling each of the first and second variable load sections to perform de-emphasis equalization operation and a final output signal corresponding to the first input signal.

6. The receiver circuit of claim 5, wherein the first input signal is an input signal, and the second input signal is a reference voltage.

7. The receiver circuit of claim 5, wherein the first and second input signals are differential signals having opposite phases.

8. The receiver circuit of claim 5, wherein the first differential amplification unit comprises:
 a first load unit coupled between a supply voltage terminal and a first node through which the first output signal is output, and configured to adjust the first impedance value in response to the first equalization signal;
 a second load unit coupled between the supply voltage terminal and a second node through which the second output signal is output, and configured to adjust the second impedance value in response to the second equalization signal;
 a first transistor including a gate receiving the first input signal and a source-drain path provided between the first node and a third node;
 a second transistor including a gate receiving the second input signal and a source-drain path provided between the second node and the third node; and
 a third transistor including a gate receiving a bias signal and a source-drain path provided between the third node and a ground voltage terminal.

9. The receiver circuit of claim 8, wherein the first load unit comprises:
 first and second resistors coupled between the supply voltage terminal and the first node in series;
 a third resistor including one terminal coupled to the supply voltage terminal; and
 a fourth transistor including a gate receiving the second equalization signal and a source-drain path provided between the other terminal of the third resistor and a common node of the first and second resistors.

10. The receiver circuit of claim 8, wherein the second load unit comprises:
 fourth and fifth resistors coupled between the supply voltage terminal and the second node in series;
 a sixth resistor including one terminal coupled to the supply voltage terminal; and
 a fifth transistor including a gate receiving the first equalization signal and a source-drain path provided between the other terminal of the sixth resistor and a common node of the fourth and fifth resistors.

11. The receiver circuit of claim 5, wherein the delay signal generating unit comprises a plurality of inverters coupled in series.

12. The receiver circuit of claim 11, wherein the delay signal generating unit comprises even number of the inverters.

13. The receiver circuit of claim 8, wherein the first to third transistors are NMOS transistors.

14. The receiver circuit of claim 9, wherein the fourth transistor is PMOS transistor.

15. The receiver circuit of claim 10, wherein the fifth transistor is PMOS transistor.

* * * * *